US012693698B2

(12) United States Patent
Farina et al.

(10) Patent No.: US 12,693,698 B2
(45) Date of Patent: Jul. 28, 2026

(54) LOW-DROPOUT VOLTAGE REGULATOR CIRCUIT

(71) Applicant: STMicroelectronics International N.V., Geneva (CH)

(72) Inventors: Alessandra Farina, Oleggio Castello (IT); Roberto Pio Baorda, Casarile (IT); Stefano Ramorini, Milan (IT)

(73) Assignee: STMicroelectronics International N.V., Geneva (CH)

( * ) Notice: Subject to any disclaimer, the term of this patent is extended or adjusted under 35 U.S.C. 154(b) by 199 days.

(21) Appl. No.: 18/770,761

(22) Filed: Jul. 12, 2024

(65) Prior Publication Data

US 2025/0028344 A1 Jan. 23, 2025

(30) Foreign Application Priority Data

Jul. 18, 2023 (IT) ........................ 102023000015027

(51) Int. Cl.
*G05F 1/575* (2006.01)
*G05F 1/565* (2006.01)

(52) U.S. Cl.
CPC .............. *G05F 1/575* (2013.01); *G05F 1/565* (2013.01)

(58) Field of Classification Search
CPC ... G05F 1/10; G05F 1/46; G05F 1/461; G05F 1/462; G05F 1/463; G05F 1/465; G05F 1/466; G05F 1/467; G05F 1/56; G05F 1/562; G05F 1/563; G05F 1/565; G05F 1/575; G05F 1/577; G05F 1/585; G05F 1/59; G05F 1/595; G05F 1/607; G05F 1/61; G05F 1/613; G05F 1/614; G05F 1/618; G05F 1/62; G05F 1/66; G05F 1/26; G05F 1/561; G05F 1/567; G05F 1/569;

(Continued)

(56) References Cited

U.S. PATENT DOCUMENTS 6,300,749 B1 10/2001 Castelli et al.
2002/0130646 A1 9/2002 Zadeh et al.

(Continued)

OTHER PUBLICATIONS

IT Search Report and Written Opinion for priority application, IT Appl. No. 102023000015027, report dated Jan. 19, 2024, 12 pgs.

*Primary Examiner* — Bryan R Perez
(74) *Attorney, Agent, or Firm* — Crowe & Dunlevy LLC

(57) ABSTRACT

An LDO regulator has a pass device arranged between an input node and an output node. The pass device is controlled at a control node by an error amplifier. A first current generator sources compensation current to the control node, a cascode device is arranged between the control node and a compensation node, and a second current generator sinks compensation current from the compensation node. A compensation capacitor is arranged between the output and compensation nodes. Load current through the pass device is sensed to generate a feedback current at a first feedback node. An input branch of a current mirror receives the feedback current. A filtering circuit is coupled between a control terminal of the input branch and a second feedback node. Output branches of the current mirror sink and source additional compensation current from the compensation node and the control node, respectively, proportional to the feedback current.

17 Claims, 7 Drawing Sheets

(58) Field of Classification Search
CPC ........ G05F 1/571; G05F 1/573; G05F 1/5735; G05F 1/08; G05F 1/153; G05F 1/16; G05F 1/34; G05F 3/02; G05F 3/30; G05F 3/22; G05F 3/222; G05F 3/242; G05F 3/225; G05F 3/245; G05F 3/20; G05F 3/00; G05F 3/08; G05F 3/10; G05F 3/16; G05F 3/18; G05F 3/185; G05F 3/227; G05F 3/247; G05F 3/26; G05F 3/265; G05F 3/24; G05F 3/262
See application file for complete search history.

(56) References Cited

U.S. PATENT DOCUMENTS

| | | | | |
|---|---|---|---|---|
| 2015/0355653 | A1* | 12/2015 | Drebinger | H03F 3/34 323/280 |
| 2018/0173261 | A1 | 6/2018 | Dahl | |
| 2019/0286182 | A1 | 9/2019 | Sakaguchi | |
| 2023/0170864 | A1 | 6/2023 | Hunter | |

* cited by examiner

LOW-DROPOUT VOLTAGE REGULATOR CIRCUIT

PRIORITY CLAIM

This application claims the priority benefit of Italian Application for Patent No. 102023000015027 filed on Jul. 18, 2023, the content of which is hereby incorporated by reference in its entirety to the maximum extent allowable by law.

TECHNICAL FIELD

The description relates to low-dropout (LDO) voltage regulator circuits, LDO regulators for short. Such LDO regulators may be used, for instance, to supply digital circuits, such as the digital section of a sensor device (e.g., an ultra-wideband MEMS accelerometer, a smart sensor, and the like).

In particular, the description relates to low-power and large-bandwidth LDO regulators.

BACKGROUND

Digital systems (e.g., memories, microcontrollers, and the like) are conventionally supplied by a digital supply voltage that has to be compatible with the thin gate oxide of (CMOS) transistors. Such a digital supply voltage is often produced by an LDO regulator. In particular, large-bandwidth LDO regulators are used to stabilize the output regulated voltage against possible variations of the capacitive load and current load. In this regard, LDO regulators implementing Miller Cascode Compensation (MCC) are particularly advantageous.

FIG. 1 is a circuit diagram exemplary of an MCC LDO regulator 10. The LDO regulator 10 has an input node 102 configured to receive a system supply voltage $V_{DD}$, and an output node 104 configured to produce a regulated output voltage $V_{reg}$. A pass device P2 having a tunable conductivity is arranged between the input node 102 and the output node 104 so as to supply current to the load and regulate the output voltage $V_{reg}$. In the Figures, the load of the LDO regulator is exemplified (for example, for modeling purposes) by a load capacitor $C_L$ arranged between node 104 and ground, and a load current source $G_L$ arranged between node 104 and ground that sinks a load current $I_L$ from node 104. The pass device P2 may be a MOS transistor having its conductive channel arranged between nodes 102 and 104, such as a p-channel MOS transistor having a source terminal coupled to node 102 and a drain terminal coupled to node 104. Additionally, the LDO regulator 10 includes an error amplifier 12 that produces a control signal $V_c$ for the gate of the pass device P2 as a function of the difference between the regulated voltage $V_{reg}$ and a reference voltage $V_{ref}$ or, more particularly, the difference between a signal $V'_{reg}$ proportional to the regulated voltage $V_{reg}$ and the reference voltage $V_{ref}$. For instance, signal $V'_{reg}$ may be produced by partitioning the regulated voltage $V_{reg}$, e.g., via a resistive voltage divider (not visible in the Figures for ease of illustration). Specifically, the error amplifier 12 may include a transistor input differential pair M1*a*, M1*b* biased by a tail current generator G1 that sinks a tail current $I_T$ and loaded by a current mirror M2*a*, M2*b* arranged between the input pair M1*a*, M1*b* and the input node 102. In particular, a first n-channel MOS transistor M1*a* has a source terminal coupled to a tail node 106, a drain terminal coupled to a biasing node 108, and a gate terminal configured to receive voltage $V'_{reg}$ (or voltage $V_{reg}$). A second n-channel MOS transistor M1*b* has a source terminal coupled to the tail node 106, a drain terminal coupled to a control node 110 where the control signal $V_c$ is produced, and a gate terminal configured to receive the reference voltage $V_{ref}$. The current generator G1 (possibly implemented as a current mirror that mirrors a reference current) is coupled between the tail node 106 and ground to sink the tail current $I_T$ from node 106. A first p-channel diode-connected MOS transistor M2*a* has a source terminal coupled to node 102, a drain terminal coupled node 108, and a gate terminal connected to its drain terminal. A second p-channel MOS transistor M2*b* has a source terminal coupled to node 102, a drain terminal coupled to node 110, and a gate terminal coupled to the gate terminal of transistor M2*a*.

The output branch of the LDO regulator 10 (i.e., the current branch including the pass element P2) is biased with a bias current $I_B$. The bias current $I_B$ is sunk from node 104 towards ground, e.g., by a current generator G4 such as a current mirror, or by a resistive path.

In a Miller-compensated (MC) LDO regulator, a compensation capacitor would be arranged between the output node 104 and the control node 110 to improve stability. In a Miller cascode-compensated (MCC) LDO regulator 10 as exemplified in FIG. 1, a cascode stage is additionally arranged between the output of the error amplifier 12 and the pass device P2. In particular, the cascode stage may include a current generator G2 arranged between the input node 102 and the control node 110 and configured to source a compensation current $I_C$ to node 110, a cascode device M3 having a conductive channel arranged between the control node 110 and a compensation node 112, and a current generator G3 arranged between the compensation node 112 and ground and configured to sink the compensation current $I_C$ from node 112. Specifically, the cascode device M3 may be an n-channel MOS transistor having a drain terminal coupled to node 110, a source terminal coupled to node 112, and a gate terminal configured to receive a fixed voltage. Such a fixed voltage provides a proper bias and ensures that the MOS transistor in the compensation path (e.g., M3 and current mirror G3) operate in saturation condition. A compensation capacitor Cc is arranged between the output node 104 and the compensation node 112 to improve stability.

Compared to an MC LDO regulator, an MCC LDO regulator provides an improved power supply rejection ratio (PSRR) as well as a larger bandwidth even when the capacitance $C_L$ of the load is high. In fact, the transfer function of an MCC LDO regulator as exemplified in FIG. 1 has the following parameters:

$$A_0 = -g_{m1} r_{out1} g_{m2} r_{out2}$$

$$p_1 \cong -\frac{1}{r_{out1} g_{m2} r_{out2} C_C}$$

$$p_2 \cong -\frac{g_{m2}}{C_L + C_C} \frac{C_C}{C_1}$$

$$p_3 \cong -\frac{g_{mC}}{C_3 + (C_L \perp C_C)}$$

$$z_1 \cong -\frac{g_{mC}}{C_3 + C_C}$$

where $A_0$ is the open loop gain in DC condition, $g_{mC}$ is the transconductance of the cascode device M3, and $p_1$, $p_2$, $p_3$ and $z_1$ are the frequencies of the poles and zero of the transfer function, respectively. Here, the approximations for the pole frequencies $p_2$ and $p_3$ are valid if $p_3 >> p_2$. The further output pole splitting of an MCC LDO regulator compared to an MC LDO regulator facilitates achieving a large bandwidth with high values of the load capacitance $C_L$.

However, the MCC architecture introduces an extra offset due to the cascode bias branch (i.e., current $I_C$) and, for certain load conditions, the two poles $p_2$ and $p_3$ become a complex-conjugate pole pair, which may result in oscillations of the regulated voltage $V_{reg}$ during transient response. To this regard, reference may be made to FIGS. 2 and 3, which are Bode magnitude plots that illustrate the magnitude of the frequency response of an MCC LDO regulator when the condition $p_3 >> p_2$ is satisfied (FIG. 2) and not satisfied (FIG. 3). The horizontal axis in FIGS. 2 and 3 represents the 0 dB level. As exemplified in FIG. 2, if the assumption $p_3 >> p_2$ is valid and $C_L >> C_C$ (e.g., nF compared to pF), then $p_3 \sim z_1$ which results in a double-pole Bode plot with $GBWP = gm_1/C_C$ that must be lower than $p_2$. Instead, if the assumption $p_3 >> p_2$ is not valid as exemplified in FIG. 3, frequency $z_1$ is fixed, pole $p_2$ is pushed towards pole $p_3$, and the two poles $p_2$ and $p_3$ become a complex-conjugate pole pair at frequency $p_{cc}$:

$$p_{cc} \cong \sqrt{\frac{g_{m2} g_{mc}}{C_1 C_L}},\ Q \cong \frac{Cc}{(Cc + C_L)} \sqrt{\frac{g_{m2} C_L}{g_{mc} C_1}}$$

resulting in an oscillation during transient, which is more evident the smaller is the margin G between the magnitude at frequency $p_{cc}$ and the 0 dB level. It is noted that the assumption $p_3 >> p_2$ may be invalid because of one or more of the following reasons: $g_{m2}$ is load dependent (so current $I_{P2}$ that flows through the pass device P2 can change from $I_B$ to $I_L + I_B$); $C_L$ may vary; $g_{mc}$ is fixed and depends on $I_C$. Therefore, the worst case is when current $I_{P2}$ is at the maximum value ($I_{P2}^{MAX}$) and capacitance $C_L$ is at the minimum value ($C_L^{MIN}$), since $p_2$ is moved to high frequency.

Therefore, there is a need in the art to provide MCC LDO regulators with improved stability and/or that may reduce (e.g., suppress) the oscillations of the regulated voltage $V_{reg}$ during transient response.

There is also need in the art to contribute in providing such MCC LDO regulators having improved stability and/or transient response (e.g., less and/or lower voltage oscillations following a variation of the load current IL).

SUMMARY

Embodiments herein concern a low-dropout voltage regulator circuit.

According to an aspect of the present description, a low-dropout voltage regulator circuit includes an input node configured to receive an input voltage and an output node configured to produce a regulated output voltage. The LDO regulator includes a pass device arranged between the input node and the output node and configured to receive a control signal from a control node. The conductivity of the pass device is controlled by the control signal. The LDO regulator includes an error amplifier configured to produce the control signal, at the control node, as a function of a difference between the regulated output voltage and a reference voltage. The LDO regulator includes a cascode stage including a first current generator configured to source a compensation current to the control node, a cascode device having a conductive channel arranged between the control node and a compensation node, and a second current generator configured to sink the compensation current from the compensation node. The LDO regulator includes a compensation capacitor arranged between the output node and the compensation node.

The LDO regulator further includes a current sensing circuit configured to sense a load current flowing through the pass device and source to a first feedback node a feedback current proportional to the load current. The LDO regulator includes an input branch of a current mirror circuit, the input branch having a conductive path arranged between the first feedback node and ground, and configured to receive the feedback current. The LDO regulator includes a low-pass filter coupled between a control terminal of the input branch and a second feedback node. The LDO regulator includes a first output branch of the current mirror circuit coupled to the second feedback node, the first output branch being configured to sink a first additional compensation current from the compensation node, the first additional compensation current being a function of the feedback current. The LDO regulator includes a second output branch of the current mirror circuit coupled to the second feedback node, the second output branch being configured to source a second additional compensation current to the control node, the second additional compensation current being equal to the first additional compensation current. The LDO regulator includes a third output branch of the current mirror circuit coupled to the second feedback node, the third output branch being configured to sink an additional bias current from the error amplifier, the additional bias current being a function of the feedback current.

One or more embodiments may thus provide an MCC LDO regulator having improved stability.

According to another aspect of the present description, a low-dropout voltage regulator circuit includes an input node configured to receive an input voltage and an output node configured to produce a regulated output voltage. The LDO regulator includes a pass device arranged between the input node and the output node and configured to receive a control signal from a control node. The conductivity of the pass device is controlled by the control signal. The LDO regulator includes an error amplifier configured to produce the control signal, at the control node, as a function of a difference between the regulated output voltage and a reference voltage. The LDO regulator includes a cascode stage including a first current generator configured to source a compensation current to the control node, a cascode device having a conductive channel arranged between the control node and a compensation node, and a second current generator configured to sink the compensation current from the compensation node. The LDO regulator includes a compensation capacitor arranged between the output node and the compensation node.

The LDO regulator further includes a current sensing circuit configured to sense a load current flowing through the pass device and source to a first feedback node a feedback current proportional to the load current. The LDO regulator includes an input branch of a current mirror circuit, the input branch having a conductive path arranged between the first feedback node and ground, and configured to receive the feedback current. The LDO regulator includes a high-pass filter coupled between the control terminal of the input branch of the current mirror circuit and a second feedback node. The LDO regulator includes a first output branch of the current mirror circuit coupled to the second feedback node, the first output branch being configured to sink a first additional compensation current from the compensation node, the first additional compensation current being a function of the feedback current. LDO regulator includes a second output branch of the current mirror circuit coupled to the second feedback node, the second output branch being configured to source a second additional compensation current to the control node, the second additional compensation current being equal to the first additional compensation current.

One or more embodiments may thus provide an MCC LDO regulator having improved transient response.

BRIEF DESCRIPTION OF THE DRAWINGS

One or more embodiments will now be described, by way of example, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for the sake of brevity.

Figure 3:
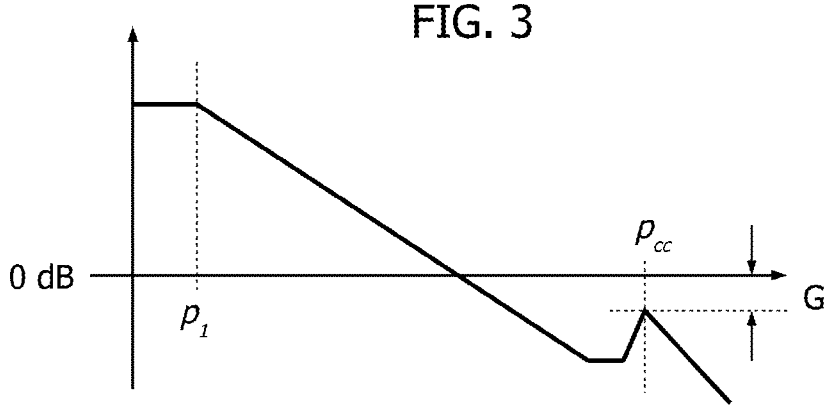
FIG. 3, previously presented, is a Bode magnitude plot exemplary of the magnitude of the transfer function (frequency response) of a conventional MCC LDO regulator when the frequency of the third pole is not much higher than the frequency of the second pole.
Figure 4:
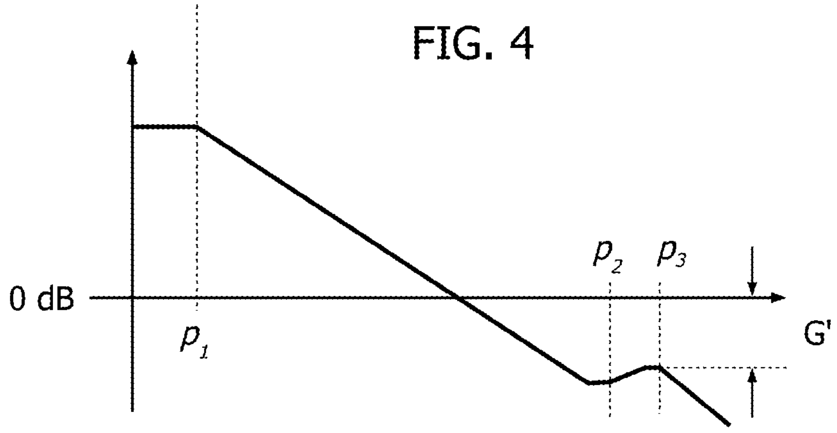
FIG. 4 is a Bode magnitude plot exemplary of the magnitude of the transfer function (frequency response) of an MCC LDO regulator according to one or more embodiments of the present description.

One or more embodiments relate to an improved MCC LDO regulator having improved stability and/or transient response. In particular, an LDO regulator according to the present disclosure has an architecture that aims at avoiding the overlap of the two poles $p_2$ and $p_3$. The architecture proposed herein facilitates splitting the frequencies of poles $p_2$ and $p_3$, in order to satisfy the condition $p_3 \gg p_2$ also in an MCC LDO regulator, considering that the frequency of pole $p_2$ changes according to the load current $I_L$. The architecture relies at least one additional loop (e.g., a DC-coupled loop and/or an AC-coupled loop) that allows injecting a current in the compensation path, thereby increasing the transconductance $g_{mC}$ of the cascode device M3. The magnitude of the injected current is a function of the load current $I_L$ (e.g., it is proportional to the load current $I_L$). By doing so, the third pole $p_3$ is pushed to a higher frequency as exemplified in FIG. 4, which is a Bode magnitude plot that illustrates the magnitude of the transfer function (frequency response) of an MCC LDO regulator according to one or more embodiments, which satisfies the condition $p_3 \gg p_2$. Here, the damping factor (γ) of the complex pole pair is increased, which results in a margin G' between the magnitude at frequency $p_3$ and the 0 dB level that is greater than the margin G of a conventional MCC LDO regulator (see again FIG. 3).

Therefore, on the one hand, the architecture proposed herein may improve the stability and increase the bandwidth of the LDO regulator, and on the other hand, it may improve and speed up the transient response (from the point of view of AC behavior).

Figure 1:
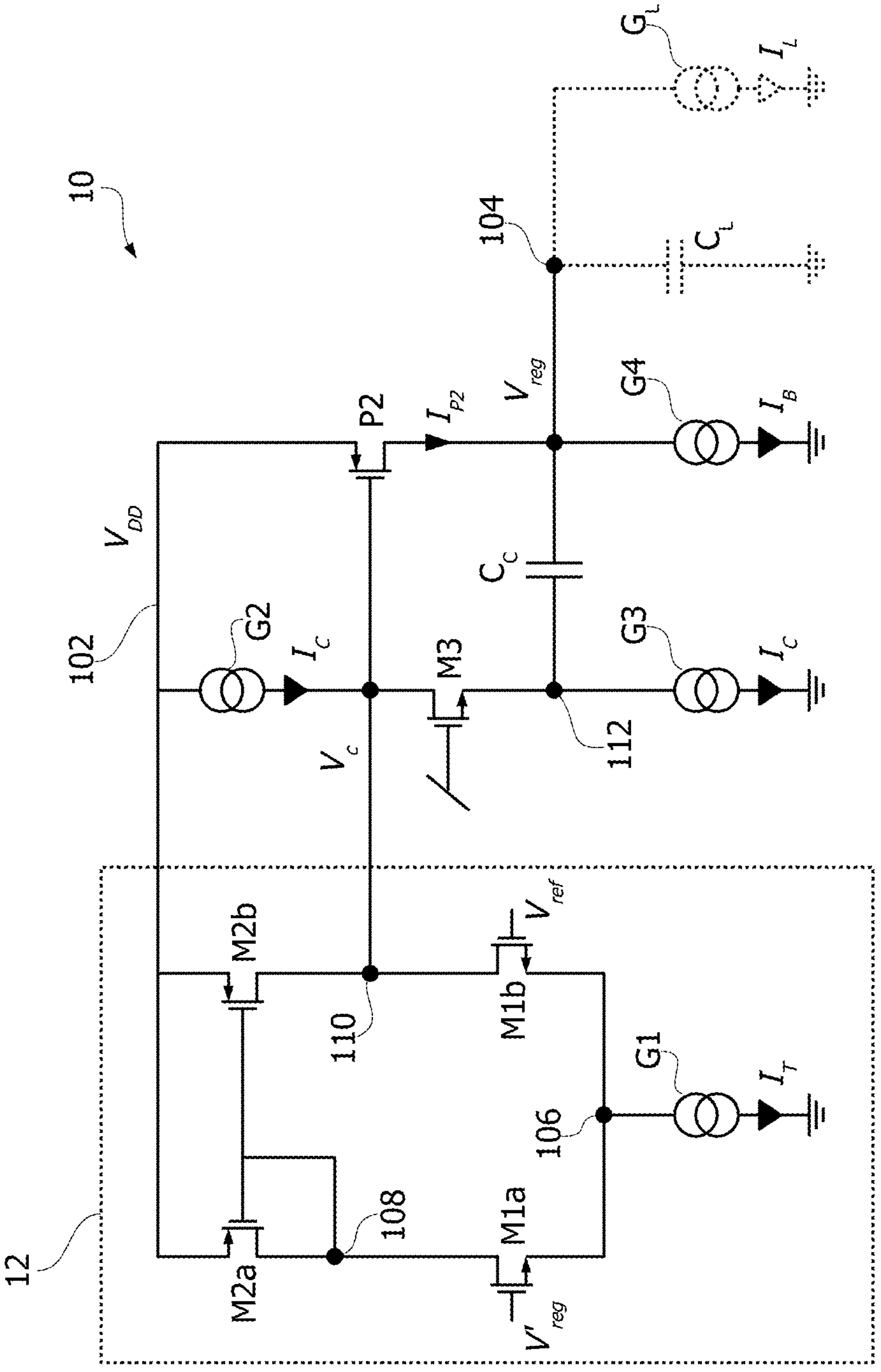
FIG. 1, previously presented, is a circuit diagram exemplary of a conventional MCC LDO regulator.
Figure 2:
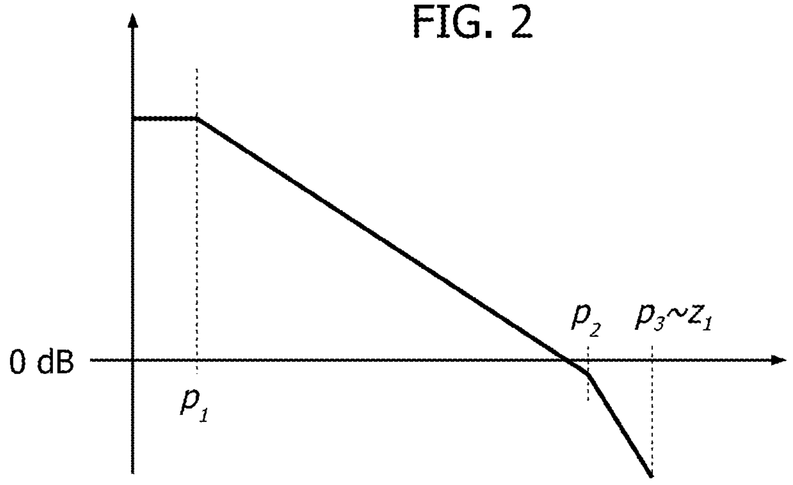
FIG. 2, previously presented, is a Bode magnitude plot exemplary of the magnitude of the transfer function (frequency response) of a conventional MCC LDO regulator when the frequency of the third pole is much higher than the frequency of the second pole.
Figure 5:
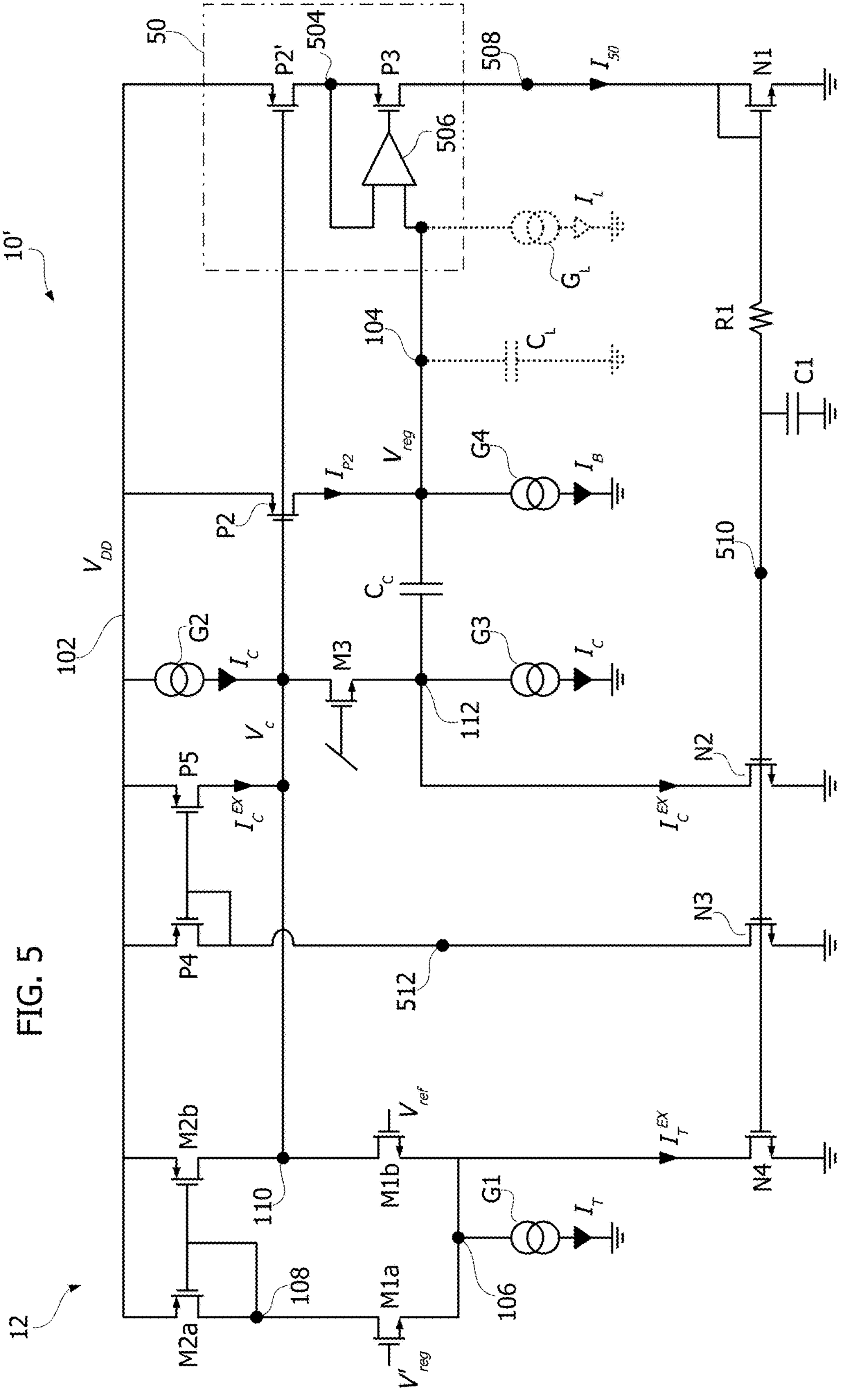
FIG. 5 is a circuit diagram exemplary of implementation details of a DC-coupled loop in an MCC LDO regulator according to one or more embodiments of the present description.

FIG. 5 is a circuit diagram exemplary of implementation details of a DC-coupled loop in an MCC LDO regulator 10' according to one or more embodiments of the present description. Substantially, the LDO regulator 10' includes all the circuit components of a conventional MCC LDO regulator 10 as exemplified in FIG. 1, plus a load current sensing circuit 50 and a DC-coupled loop.

As exemplified in FIG. 5, the current sensing circuit 50 is configured to sense the current $I_{P2}$ flowing through the pass device P2 and produce a feedback current $I_{50}$ as a function of current $I_{P2}$, in particular proportional to current $I_{P2}$. In one or more exemplary embodiments, circuit 50 includes a (e.g., scaled) replica transistor P2' that is configured to replicate the behavior of transistor P2, that is, transistor P2' may be a MOS transistor having its conductive channel arranged between node 102 and a replica output node 504 and configured to receive the same control signal $V_C$ as transistor P2, such as a p-channel MOS transistor having a source terminal coupled to node 102, a drain terminal coupled to node 504, and a gate terminal coupled to node 110. Further, the circuit 50 may include a circuit arrangement configured to set the voltage of node 504 equal to the voltage $V_{reg}$ of node 104, so that the drain-source voltage of transistor P2' equals the drain-source voltage of transistor P2. To this regard, the circuit 50 may include a transconductance amplifier (OTA) 506 having a first input terminal coupled to node 104 and a second input terminal coupled to node 504, and an output terminal coupled to the gate terminal of a transistor P3 whose conductive channel is coupled in series to the conductive channel of transistor P2'. For instance, transistor P3 may be a p-channel MOS transistor having a source terminal coupled to node 504, a drain terminal coupled to a feedback node 508, and a gate terminal coupled to the output of amplifier 506. Substantially, amplifier 506 with transistor P3 and the respective feedback connection provide a buffer circuit. Therefore, circuit 50 sources a feedback current $I_{50}$ to node 508, the feedback current $I_{50}$ being a function of (e.g., proportional to) the current $I_{P2}$.

As exemplified in FIG. 5, a diode-connected transistor N1 is arranged between the feedback node 508 and ground. In particular, transistor N1 may be an n-channel MOS transistor having a drain terminal coupled to node 508, a source terminal coupled to ground, and a gate terminal coupled to its drain terminal. As will be further discussed in the following, transistor N1 operates as the input branch of multiple current mirrors that are configured to mirror (possibly, rescaling) current $I_{50}$ into or from nodes 106, 110 and 112.

As exemplified in FIG. 5, the DC-coupled loop includes a low-pass filter interposed between the input branch N1 and the output branches of the current mirrors. The low-pass filter may include, for instance, an RC filter including a resistor R1 coupled between the gate terminal of transistor N1 and a node 510, and a capacitor C1 coupled between node 510 and ground.

As exemplified in FIG. 5, the DC-coupled loop includes the output branch of a first current mirror configured to sink a current $I_C^{EX}$ from the compensation node 112 (e.g., an additional or extra current compared to current $I_C$ sunk by generator G3). For instance, the output branch of such a first current mirror may include an n-channel MOS transistor N2 having a drain terminal coupled to node 112, a source terminal coupled to ground, and a gate terminal coupled to node 510, so that transistor N2 sinks a (e.g., scaled, proportional) replica of current $I_{50}$ from node 112.

As exemplified in FIG. 5, the DC-coupled loop includes the output branch of a second current mirror configured to source the current $I_C^{EX}$ to the control node 110 (e.g., an additional or extra current compared to current $I_C$ sourced by generator G2). For instance, the output branch of such a second current mirror may include an n-channel MOS transistor N3 having a drain terminal coupled to the input of a further p-channel current mirror at a node 512, a source terminal coupled to ground, and a gate terminal coupled to node 510. The further p-channel current mirror is configured to mirror (and possibly rescale) the current sunk by transistor N3 so that a current $I_C^{EX}$ is injected into node 110. In particular, the further p-channel current mirror may include an input p-channel diode-connected MOS transistor P4 having a drain terminal coupled to node 512, a source terminal coupled to node 102, and a gate terminal coupled to its drain terminal, as well as an output p-channel MOS transistor P5 having a drain terminal coupled to node 110, a source terminal coupled to node 102, and a gate terminal coupled to the gate terminal of transistor P4. Overall, transistors N3, P4 and P5 are sized so that so that transistor P5 sources to node 110 the same current $I_C^{EX}$ that transistor N2 sinks from node 112. For instance, transistor N3 may have the same dimensions (W/L) of transistor N2, and the mirroring factor of the current mirror P4-P5 may be equal to 1.

As exemplified in FIG. 5, the DC-coupled loop includes the output branch of a third current mirror configured to sink a current $I_T^{EX}$ from the tail node 106 (e.g., an additional or extra current compared to current $I_T$ sunk by generator G1). For instance, the output branch of such a third current mirror may include an n-channel MOS transistor N4 having a drain terminal coupled to node 106, a source terminal coupled to ground, and a gate terminal coupled to node 510, so that transistor N4 sinks a (e.g., scaled) replica of current $I_{50}$ from node 106. The additional tail current $I_T^{EX}$ is equally split between transistors M1*a* and M1*b* of the input differential pair.

The DC behavior of the DC-coupled loop exemplified in FIG. 5 is discussed in the following. The current sunk from node 112 by transistor N2 and the current sourced to node 110 by transistor P5 are equal (both $I_C^{EX}$), and the currents flowing through transistors M2*b* and M1*b* are equal (both $I_T^{EX}/2$). Therefore, the net current at node 110 is null (zero), which results in the DC gain of the loop being also null (zero), which is expected insofar as the DC-coupled loop aims at adjusting (only) the bias (DC) in order to avoid AC peaking (i.e., moving the frequency of the third pole $p_3$ far away from the frequency of pole $p_2$ accordingly with the load current, as exemplified in FIGS. 3 and 4, thereby improving the frequency response and the system stability).

The AC behavior of the DC-coupled loop exemplified in FIG. 5 is discussed in the following. Due to the fact that extra pull up currents at node 110, and that the currents through transistors M2*b* and P5 pass through extra current mirrors, as frequency increases the following happens: the current sourced by transistor M2*b* to node 110 is smaller than the current sunk by transistor M1*b* from node 110 (e.g., it is less than $I_T^{EX}/2$), and the current sourced by transistor P5 to node 110 is smaller than the current sunk by transistor N2 from node 112 (e.g., it is less than $I_C^{EX}$). Therefore, in overall a current is sunk from node 110, which results in that the AC gain of the loop is positive. A positive AC gain of the loop would speed up the load transient response, but this boost action is limited by the low-pass filter (R1, C1) that ensures that the loop AC gain remains below the 0 dB level; otherwise, the transient response could show unwanted oscillations during transient.

Therefore, a DC-coupled loop as exemplified in FIG. 5 (R1, C1, N2, N3, P4, P5, N4) has two effects. By changing the bias current of the cascode branch (i.e., sourcing current $I_C^{EX}$ to node 110 and sinking current $I_C^{EX}$ from node 112) as a function of (for example, proportional to) the load current $I_{P2}$ (e.g., tracking the changes of $I_{P2}$), the transconductance $g_{mC}$ of the cascode device M3 is increased and the frequency of pole $p_3$ moves as a function of the load current $I_L$ (i.e., increases or decreases accordingly, thus maintaining frequency separation between poles $p_2$ and $p_3$). As a second effect, by changing the bias current of the input differential pair (i.e., sinking current $I_T^{EX}$ from node 106) as a function of (for example, proportional to) the load current $I_{P2}$ (e.g., tracking the changes of $I_{P2}$), the ratio $g_{mC}/g_{mIN}$ between the transconductance of the cascode device M3 and the transconductance of the input differential pair is kept constant, which results in an increase of the Gain-BandWidth Product (GBWP) of the loop and in a fixed offset as a function of the load current. The increase of the GBWP is advantageous because it results in a faster response, and there are no stability issues due to the fact that pole $p_2$ is moved to a higher frequency.

The DC-coupled loop exemplified in FIG. 5 aims at adjusting the (DC) bias of the LDO, but its low-pass filter (R1, C1) limits the boost action that could, in principle, speed up the load transients.

Therefore, one or more embodiments may additionally or alternatively include an AC-coupled loop designed to improve the LDO response to fast load transients, while avoiding oscillations of the regulated voltage.

Figure 6:
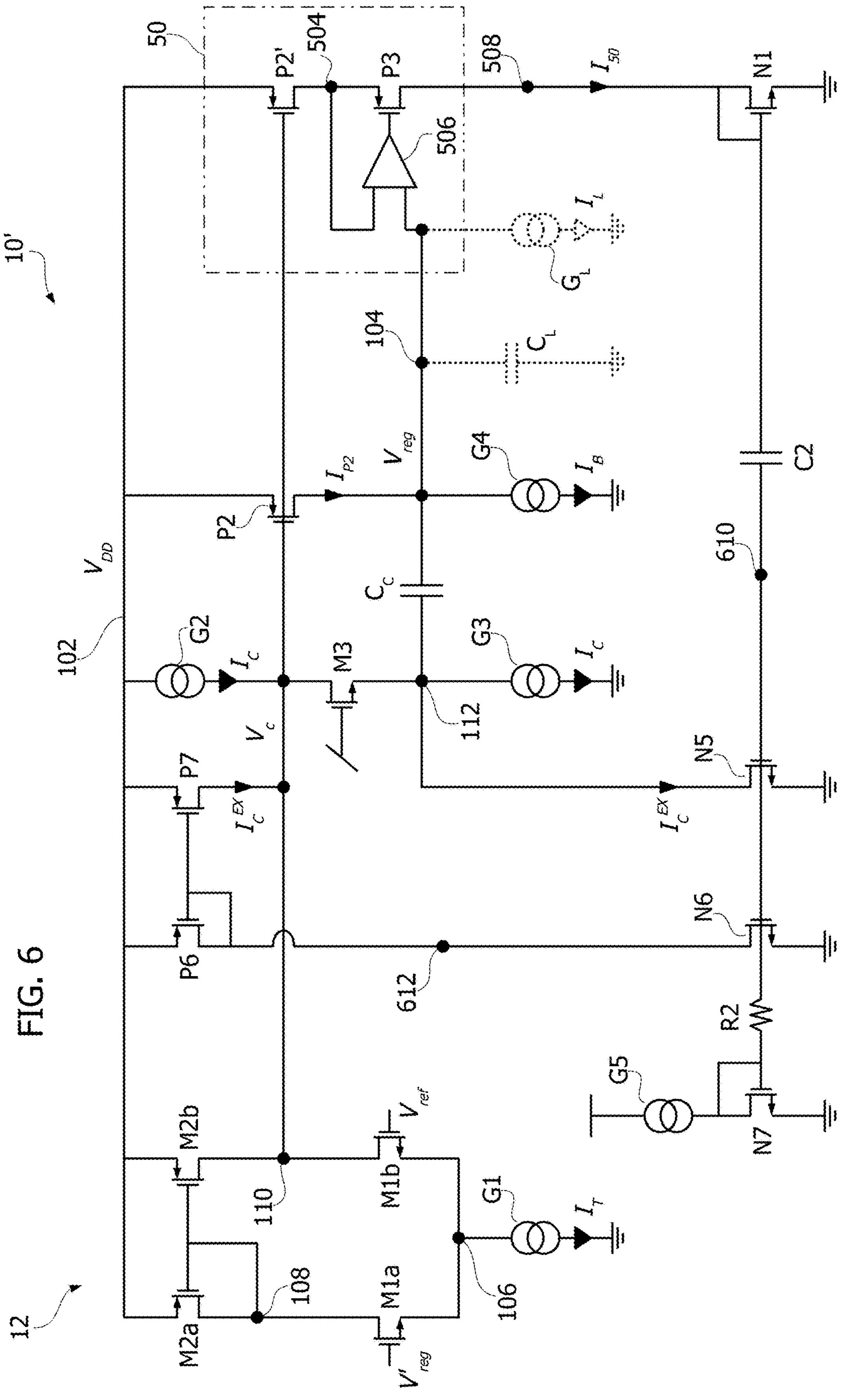
FIG. 6 is a circuit diagram exemplary of implementation details of an AC-coupled loop in an MCC LDO regulator according to one or more embodiments of the present description.

FIG. 6 is a circuit diagram exemplary of implementation details of such an AC-coupled loop in an MCC LDO regulator 10' according to one or more embodiments of the present description. In some embodiments, the LDO regulator 10' includes all the circuit components of a conventional MCC LDO regulator 10 as exemplified in FIG. 1, plus the load current sensing circuit 50 and optionally the DC-coupled loop exemplified in FIG. 5, plus the AC-coupled loop. Therefore, it will be understood that one or more embodiments include the circuitry of both FIGS. 5 and 6, which has been represented in two distinct Figures for ease of illustration only, where the load current sensing circuit 50 may be the same for both the DC-coupled and the AC-coupled loops (i.e., may be instantiated only once in the LDO regulator 10') or may be replicated for each of the DC-coupled and the AC-coupled loops (i.e., may be instantiated twice in the LDO regulator 10'). It will also be understood that, in some embodiments, the DC-coupled loop of FIG. 5 may not be present, and only the AC-coupled loop of FIG. 6 may be present. Also here, transistor N1 operates as the input branch of multiple current mirrors that are configured to mirror (possibly, rescaling) current $I_{50}$ into or from nodes 110 and 112.

As exemplified in FIG. 6, the AC-coupled loop includes a high-pass filter interposed between the input branch N1 and the output branches of the current mirrors. The high-pass filter may include, for instance, a capacitive filter including a capacitor C2 coupled between the gate terminal of transistor N1 and a node 610.

As exemplified in FIG. 6, the AC-coupled loop includes the output branch of a first current mirror configured to sink a current $I_C^{EX}$ from the compensation node 112 (e.g., an additional or extra current compared to current $I_C$ sunk by generator G3). For instance, the output branch of such a first current mirror may include an n-channel MOS transistor N5 having a drain terminal coupled to node 112, a source terminal coupled to ground, and a gate terminal coupled to node 610, so that transistor N2 sinks a (e.g., scaled) replica of current $I_{50}$ from node 112.

As exemplified in FIG. 6, the AC-coupled loop includes the output branch of a second current mirror configured to source the current $I_C^{EX}$ to the control node 110 (e.g., an additional or extra current compared to current $I_C$ sourced by generator G2). For instance, the output branch of such a second current mirror may include an n-channel MOS transistor N6 having a drain terminal coupled to the input of a further p-channel current mirror at a node 612, a source terminal coupled to ground, and a gate terminal coupled to node 610. The further p-channel current mirror is configured to mirror (and possibly rescale) the current sunk by transistor N6 so that a current $I_C^{EX}$ is injected into node 110. In particular, the further p-channel current mirror may include an input p-channel diode-connected MOS transistor P6 having a drain terminal coupled to node 612, a source terminal coupled to node 102, and a gate terminal coupled to its drain terminal, as well as an output p-channel MOS transistor P7 having a drain terminal coupled to node 110, a source terminal coupled to node 102, and a gate terminal coupled to the gate terminal of transistor P6. Overall, transistors N6, P6 and P7 are sized so that so that transistor P7 sources to node 110 the same current $I_C^{EX}$ that transistor N5 sinks from node 112. For instance, transistor N6 may have the same dimensions (W/L) of transistor N5, and the mirroring factor of the current mirror P6-P7 may be equal to 1.

As exemplified in FIG. 6, the AC-coupled loop includes a diode-connected n-channel MOS transistor N7 having a drain terminal biased by a current generator G5, a source terminal coupled to ground, and a gate terminal coupled to node 610 via a resistor R2. By doing so, transistors N5 and N6 can be weakly polarized in steady state condition, so to ensure a minimum bias. Resistor R2 provides a proper bias in DC condition and implements, together with capacitor C2, the high pass filter from the AC point of view.

In DC, the AC-coupled loop exemplified in FIG. 6 is decoupled by capacitor C2. The AC behavior (at frequencies higher than the high-pass pole frequency due to capacitor C2) of the AC-coupled loop is discussed in the following. Due to the fact that extra pull up currents at node 110, and that the current through transistor P7 passes through extra current mirrors, the current sourced by transistor P7 to node 110 is smaller than the current sunk by transistor N5 from node 112 (e.g., it is less than $I_C^{EX}$). Therefore, in overall a current is sunk from node 110, which results in that the AC gain of the loop is positive. A positive AC gain of the loop speeds up the load transient response. As a design criterion, the AC gain of the AC-coupled loop may be lower than −20 dB at any frequency.

Therefore, an AC-coupled loop as exemplified in FIG. 6 (C2, N5, N6, P6, P7, R2, N7) has the effect of speeding up the load transient response injecting immediately an extra current in the compensation path (increasing the transconductance $g_{mC}$). By doing so, the oscillations during the transient response are limited or suppressed.

Figure 7:
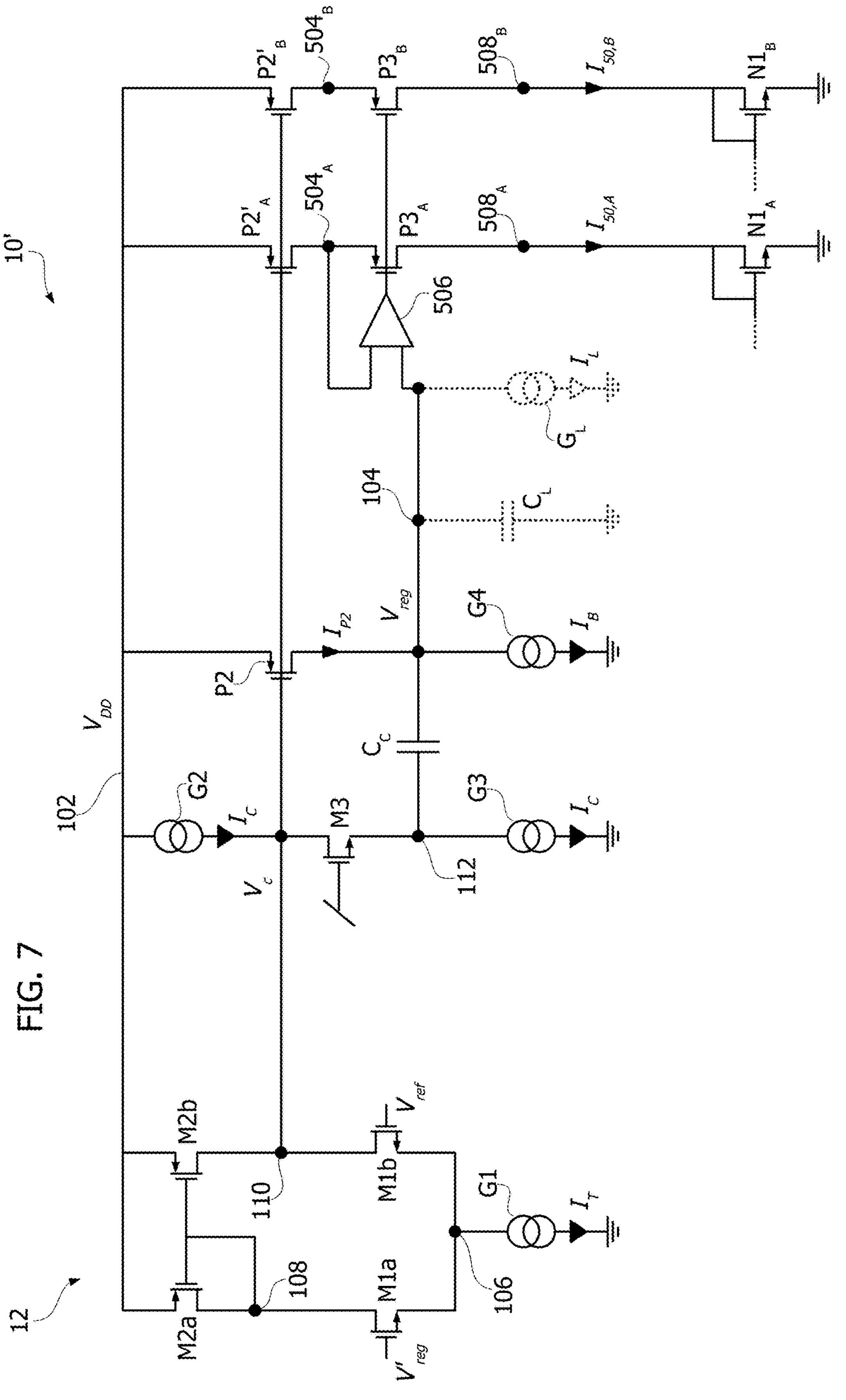
FIG. 7 is a circuit diagram exemplary of implementation details of current sensing circuitry for an AC-coupled loop and a DC-coupled loop in an MCC LDO regulator according to one or more embodiments of the present description.

Since in different embodiments the LDO regulator 10' may include only the DC-coupled loop, or only the AC-coupled loop, or both the DC-coupled and AC-coupled loops, different architectures may be used for current sensing. In some embodiments as previously discussed, a single current sensing circuit 50 and a single diode-connected transistor N1 are implemented, with the two loops (DC and AC) being coupled to the gate terminal of transistor N1. In this case, different sizing of the currents injected by the two loops may be achieved by using different sizing of the current mirrors implemented in each loop. In other embodiments, some elements of the current sensing circuitry may be replicated (e.g., instantiated twice). For instance, the current flow line that includes transistors P2', P3 and N1 may be replicated as exemplified in FIG. 7, with the gate terminals of both transistors P2' (e.g., $P2'_A$ and $P2'_B$) being coupled to the control node 110, the gate terminals of both transistors P3 (e.g., $P3_A$ and $P3_B$) being coupled to the output terminal of a single transconductance amplifier 506, and a dedicated diode-connected transistor N1 (e.g., $N1_A$ and $N1_B$) being coupled to a respective transistor P3 and to a respective one of the loops (DC or AC). In some further embodiments, the amplifier 506 may be replicated (e.g., instantiated twice) as well.

Figure 8:
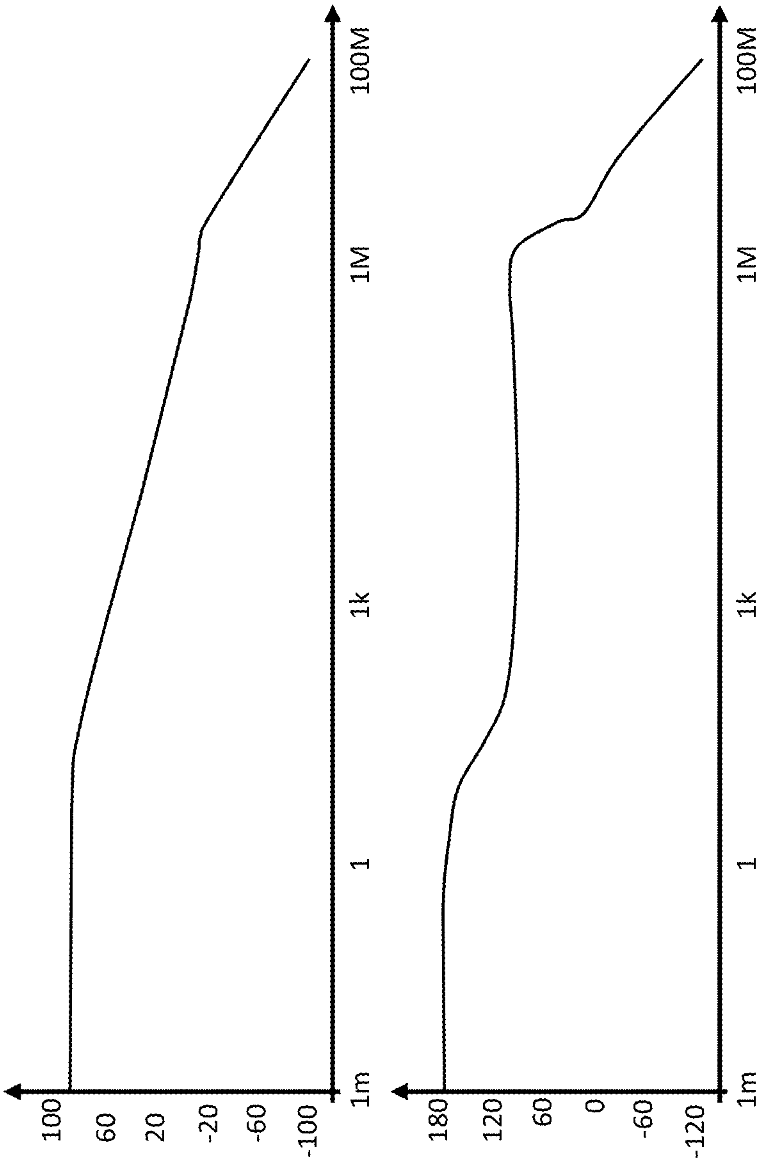
FIG. 8 is a Bode plot exemplary of the magnitude and phase of the transfer function (frequency response) of an MCC LDO regulator according to one or more embodiments.

FIG. 8 is a Bode plot that illustrates the magnitude (upper plot of FIG. 8, unit: [dB], from −120 dB to 100 dB on the vertical axis) and phase (lower plot of FIG. 8, unit: [degrees], from −140° to 200° on the vertical axis) of the simulated transfer function (frequency response) of an MCC LDO regulator according to one or more embodiments for OTA stability analysis (horizontal axis: frequency, unit: [Hz], from 1 mHz to 100 MHz). Simulation confirms the theoretical analysis: the complex pole pair peak is attenuated (a higher damping factor is attained).

Figure 9:
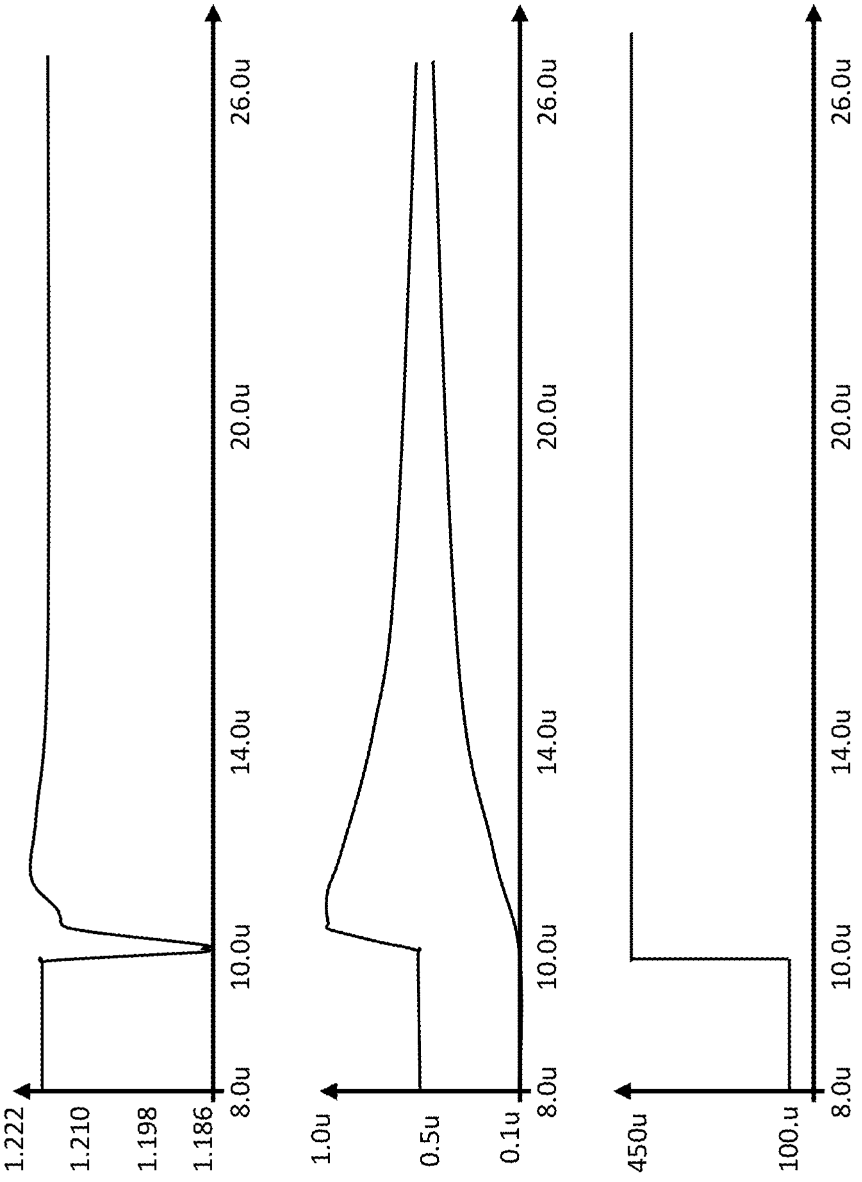
FIG. 9 is a plot including signal waveforms exemplary of the transient response of an MCC LDO regulator according to one or more embodiments.

FIG. 9 includes multiple plots that illustrate the simulated transient response of an MCC LDO regulator according to one or more embodiments in case of a load current step. In particular: the upper plot of FIG. 9 illustrates the output voltage $V_{reg}$ (unit: [V], from 1.186 V to 1.222 V on the vertical axis), the middle plot of FIG. 9 illustrates the current injected by the AC-coupled loop $I_{AC}$ and the current injected by the DC-coupled loop $I_{DC}$ (unit: [μA], from 0.1 μA to 1.0 μA on the vertical axis), and the lower plot of FIG. 9 illustrates the load current $I_L$ (unit: [μA], from 50.0 μA to 500.0 μA on the vertical axis, current step=375 μA). The horizontal axis of the plots of FIG. 9 shows time, unit: [μs], from 8.0 μs to 26.0 μs.

One or more embodiments as exemplified herein may thus provide one or more of the following advantages: improved stability and bandwidth of the LDO regulator; and/or improved transient response of the LDO regulator.

Without prejudice to the underlying principles, the details and embodiments may vary, even significantly, with respect to what has been described by way of example, without departing from the extent of protection.

The extent of protection is determined by the annexed claims.

The claims are an integral part of the technical teaching provided herein in respect of the embodiments.

The invention claimed is:

1. A low-dropout voltage regulator circuit, comprising:
an input node configured to receive an input voltage;
an output node configured to produce a regulated output voltage;
a pass device arranged between said input node and said output node and configured to receive a control signal from a control node, wherein a conductivity of the pass device is controlled by the control signal;
an error amplifier configured to produce said control signal as a function of a difference between said regulated output voltage and a reference voltage;
a cascode stage comprising a first current generator configured to source a compensation current to said control node, a cascode device having a conductive channel arranged between said control node and a compensation node, and a second current generator configured to sink said compensation current from said compensation node;
a compensation capacitor arranged between said output node and said compensation node;
a current sensing circuit configured to sense a load current flowing through said pass device and source to a first feedback node a feedback current that is proportional to said load current; and
a current mirror circuit comprising:
an input branch formed by a conductive path arranged between said first feedback node and ground and configured to receive said feedback current;
a low-pass filter coupled between a control terminal of said input branch and a second feedback node;
a first output branch coupled to said second feedback node, said first output branch configured to sink a first additional compensation current from said compensation node, said first additional compensation current being proportional to said feedback current;
a second output branch coupled to said second feedback node, said second output branch configured to source a second additional compensation current to said control node, said second additional compensation current being equal to said first additional compensation current; and
a third output branch coupled to said second feedback node, said third output branch configured to sink an additional bias current from said error amplifier, said additional bias current being proportional to said feedback current.

2. The circuit of claim 1, wherein said input branch of the current mirror circuit comprises a diode-connected transistor having a conductive channel arranged between said first feedback node and ground, and said low-pass filter is coupled between a control terminal of said diode-connected transistor and said second feedback node.

3. The circuit of claim 1, wherein said current sensing circuit comprises:
a replica device of said pass device arranged between said input node and a replica output node and configured to receive said control signal from said control node; and
a buffer circuit configured to force a voltage at said replica output node to equal to said regulated output voltage at said output node.

4. The circuit of claim 1:
wherein said error amplifier comprises a transistor input differential pair having a common tail node coupled to a tail current generator;
wherein the tail current generator is configured to sink a tail current from said common tail node;
wherein the transistor input differential pair is loaded by a current mirror; and
wherein said third output branch of the current mirror circuit is configured to sink said additional bias current from said common tail node.

5. The circuit of claim 1, wherein said pass device comprises a p-channel MOS transistor having a source terminal coupled to said input node, a drain terminal coupled to said output node and a gate terminal coupled to said control node.

6. The circuit of claim 1, wherein the current mirror circuit further comprises:
a high-pass filter coupled between said control terminal of said input branch and a third feedback node;
a fourth output branch coupled to said third feedback node, said fourth output branch being configured to sink a third additional compensation current from said compensation node, said third additional compensation current being proportional to said feedback current; and
a fifth output branch coupled to said third feedback node, said fifth output branch being configured to source a fourth additional compensation current to said control node, said fourth additional compensation current being equal to said third additional compensation current.

7. The circuit of claim 6, further comprising a diode-connected transistor having a conductive channel arranged between a current generator and ground, and a control terminal resistively coupled to said third feedback node.

8. A low-dropout voltage regulator circuit, comprising:
an input node configured to receive an input voltage;
an output node configured to produce a regulated output voltage;
a pass device arranged between said input node and said output node and configured to receive a control signal from a control node, wherein a conductivity of the pass device is controlled by the control signal;

an error amplifier configured to produce said control signal as a function of a difference between said regulated output voltage and a reference voltage;

a cascode stage comprising a first current generator configured to source a compensation current to said control node, a cascode device having a conductive channel arranged between said control node and a compensation node, and a second current generator configured to sink said compensation current from said compensation node;

a compensation capacitor arranged between said output node and said compensation node;

a current sensing circuit configured to sense a load current flowing through said pass device and source to a first feedback node a feedback current that is proportional to said load current;

a current mirror circuit comprising:

an input branch formed by a conductive path arranged between said first feedback node and ground and configured to receive said feedback current;

a high-pass filter coupled between a control terminal of said input branch and a second feedback node;

a first output branch coupled to said second feedback node, said first output branch configured to sink a first additional compensation current from said compensation node, said first additional compensation current being proportional to said feedback current; and a second output branch coupled to said second feedback node, said second output branch configured to source a second additional compensation current to said control node, said second additional compensation current being equal to said first additional compensation current.

9. The circuit of claim 8, wherein said input branch of the current mirror circuit comprises a diode-connected transistor having a conductive channel arranged between said first feedback node and ground, and said high-pass filter is coupled between a control terminal of said diode-connected transistor and said second feedback node.

10. The circuit of claim 8, wherein said current sensing circuit comprises:

a replica device of said pass device arranged between said input node and a replica output node and configured to receive said control signal from said control node; and a buffer circuit configured to force a voltage at said replica output node to equal to said regulated output voltage at said output node.

11. The circuit of claim 8:

wherein said error amplifier comprises a transistor input differential pair having a common tail node coupled to a tail current generator;

wherein the tail current generator is configured to sink a tail current from said common tail node;

wherein the transistor input differential pair is loaded by a current mirror; and wherein said third output branch of the current mirror circuit is configured to sink said additional bias current from said common tail node.

12. The circuit of claim 8, wherein said pass device comprises a p-channel MOS transistor having a source terminal coupled to said input node, a drain terminal coupled to said output node and a gate terminal coupled to said control node.

13. The circuit of claim 8, further comprising a diode-connected transistor having a conductive channel arranged between a current generator and ground, and a control terminal resistively coupled to said second feedback node.

14. A low-dropout voltage regulator circuit, comprising:

an input node configured to receive an input voltage;

an output node configured to produce a regulated output voltage;

a pass device arranged between said input node and said output node and configured to receive a control signal from a control node, wherein a conductivity of the pass device is controlled by the control signal;

an error amplifier configured to produce said control signal as a function of a difference between said regulated output voltage and a reference voltage;

a cascode stage comprising a first current generator configured to source a compensation current to said control node, a cascode device having a conductive channel arranged between said control node and a compensation node, and a second current generator configured to sink said compensation current from said compensation node;

a compensation capacitor arranged between said output node and said compensation node;

a first current sensing circuit configured to sense a load current flowing through said pass device and source to a first feedback node a first feedback current that is proportional to said load current;

a first current mirror circuit comprising:

a first input branch formed by a conductive path arranged between said first feedback node and ground and configured to receive said first feedback current;

a low-pass filter coupled between a control terminal of said first input branch and a second feedback node;

a first output branch coupled to said second feedback node, said first output branch configured to sink a first additional compensation current from said compensation node, said first additional compensation current being proportional to said feedback current;

a second output branch of said current mirror circuit coupled to said second feedback node, said second output branch configured to source a second additional compensation current to said control node, said second additional compensation current being equal to said first additional compensation current; and a third output branch of said current mirror circuit coupled to said second feedback node, said third output branch configured to sink an additional bias current from said error amplifier, said additional bias current being proportional to said feedback current;

a second current sensing circuit configured to sense the load current flowing through said pass device and source to a third feedback node a second feedback current that is proportional to said load current;

a second current mirror circuit comprising:

a second input branch formed by a conductive path arranged between said third feedback node and ground and configured to receive said second feedback current;

a high-pass filter coupled between a control terminal of said second input branch and a fourth feedback node;

a fourth output branch coupled to said fourth feedback node, said fourth output branch configured to sink a third additional compensation current from said compensation node, said third additional compensation current being proportional to said further feedback current; and a fifth output branch coupled to said fourth feedback node, said fifth output branch configured to source a fourth additional compensation current to said control node, said fourth additional compensation current being equal to said third additional compensation current.

15. The circuit of claim 14, further comprising a diode-connected transistor having a conductive channel arranged between a current generator and ground, and a control terminal resistively coupled to said fourth feedback node.

16. The circuit of claim 14:

wherein said error amplifier comprises a transistor input differential pair having a common tail node coupled to a tail current generator;

wherein the tail current generator is configured to sink a tail current from said common tail node;

wherein the transistor input differential pair is loaded by a current mirror; and wherein said third output branch of the first current mirror circuit is configured to sink said additional bias current from said common tail node.

17. The circuit of claim 14, wherein said pass device comprises a p-channel MOS transistor having a source terminal coupled to said input node, a drain terminal coupled to said output node and a gate terminal coupled to said control node.

* * * * *